United States Patent [19]

Marino

[11] Patent Number: 5,379,810
[45] Date of Patent: Jan. 10, 1995

[54] SPILL CONTAINMENT TRANSFER BAG

[76] Inventor: Thomas F. Marino, 26 Hydelor Ave., Prospect, Conn. 06712

[21] Appl. No.: 118,958

[22] Filed: Sep. 9, 1993

[51] Int. Cl.6 ............................................. F16L 55/00
[52] U.S. Cl. ...................................... 141/10; 141/86;
141/98; 141/114; 141/313; 137/312; 383/41;
383/81; 383/86; 383/103
[58] Field of Search ................. 141/18, 86–88,
141/98, 114, 311 A, 313, 314, 316;
137/312–314; 285/13; 222/108; 383/41, 81, 86,
100, 103; 312/1; 405/52

[56] References Cited

U.S. PATENT DOCUMENTS

| 446,518 | 2/1891 | Hesser . | |
|---|---|---|---|
| 2,438,245 | 3/1948 | Gregg | 137/312 X |
| 2,754,869 | 7/1956 | Bartels . | |
| 3,727,656 | 4/1973 | Luders . | |
| 4,020,922 | 5/1977 | Klasel . | |
| 4,211,266 | 7/1980 | Massey . | |
| 4,240,474 | 12/1980 | Perkins . | |
| 4,307,764 | 12/1981 | Nattrass . | |
| 4,550,755 | 11/1985 | Vredenburg . | |
| 4,603,432 | 7/1986 | Marino . | |
| 4,626,291 | 12/1986 | Natale | 312/1 X |
| 4,676,284 | 6/1987 | De Crane . | |
| 4,707,969 | 11/1987 | Marino . | |
| 4,883,329 | 11/1989 | Flannery et al. | 312/1 |
| 4,912,358 | 3/1990 | Vitta | 312/1 |
| 4,971,477 | 11/1990 | Webb et al. | 405/52 X |
| 4,988,216 | 1/1991 | Lyman | 383/86 X |
| 4,991,633 | 2/1991 | Wong . | |
| 5,035,516 | 7/1991 | Pacheco | 383/103 X |
| 5,152,635 | 10/1992 | Ziu | 405/52 |
| 5,186,577 | 2/1993 | Reicin et al. | 405/52 |
| 5,269,946 | 12/1993 | Goldhaber et al. | 604/410 X |
| 5,289,858 | 3/1994 | Grabenkort | 141/86 X |
| 5,313,991 | 5/1994 | Murray et al. | 141/86 |

Primary Examiner—J. Casimer Jacyna

[57] ABSTRACT

A spill containment bag for use about the coupling of a tank port and a conduit comprises a flexible bag member defining an enclosure with a pair of opposed apertures in its sidewall to permit passage therethrough of the tank port and conduit, and the sidewall seats snugly about the elements passing therethrough so as to provide a seal. The top wall of the bag provides a disengageable closure for the bag to permit access to its interior. One or more vents may be provided to permit air to flow therethrough, and carrying straps are also provided. To seal the bag, flaps cover the apertures and vents. In use, the top wall is opened to permit coupling the conduit to the tank port, and the vents may be opened as required for the particular operation. When the operation is complete, the conduit is disconnected and the flaps overlying the apertures and vents are closed to permit transport of the bag with its contents.

20 Claims, 4 Drawing Sheets

SPILL CONTAINMENT TRANSFER BAG

BACKGROUND OF THE INVENTION

The present invention relates generally to vessels for containing spills of liquid or solid material, and, more particularly, to a collapsible spill containment transfer bag for use at the juncture of a port of a storage tank and a conduit or hose.

The transportation of hazardous and non-hazardous liquid and solid chemical and petroleum products is a thriving industry in this and other countries, with large quantities of such products being transported annually. Trucks and railroad cars having storage tanks are normally utilized to effect the transport of these materials. Within factories, materials are often stored in tanks or bins of varying designs and sizes and frequently transported from those tanks to other locations. In addition to liquids, dry bulk material in the form of beads, pellets, granules or powders are similarly stored and transported.

Typically, conduits such as hoses are employed to fill or empty the tanks carrying such liquid or solid products, with the connection and disconnection of the hoses often leading to spillage of the material from the discharge portions of the port or the end of the conduit. The repetitive process of conduit connection and disconnection can lead to an accumulation of the spilled material about the port, resulting not only in the loss of product, but also in a threat to the environment and even hazard to human health and safety in the case of hazardous substances.

Additionally, there is often a requirement for sampling the contents of a tank. This sample often must be transported to a remote location for future analysis, thus necessitating the use of a secure container.

The term "tank" as used herein refers to movable and stationary storage tanks, bins, and like structures for both liquid and solid materials and having a port or like fitting through which the contents may be discharged (or introduced).

The term "port" as used herein refers to a pipe or other fitting on a tank with a closure which may be opened to permit flow of material therethrough.

The term "conduit" as used herein refers to pipes, hoses and like members which may be coupled to a port for passage of material to and from a tank.

There is a paucity of prior art to deal with this type of spill at the juncture of a conduit and the storage receptacle. One prior art method dealing with dry bulk material, entails placing a large pan to collect and retain any spill directly beneath the juncture of the hose and a tank fitting. This method leaves the problem of how to dispose of the contents of the pan and how to deal with transporting a pan full of dry bulk material. There is additionally the risk of secondary spill should the pan be dislodged or overturned while collecting the spill. Further, a large pan is an inappropriate means for sample collection since transfer of the contents of the pan to more suitable sample receptacle is awkward.

It is an object of the present invention to provide a novel spill containment transfer bag that will easily contain a liquid or dry bulk material spill resulting from the connection and disconnection of a conduit to a tank.

It is also an object to provide such a containment transfer bag which is collapsible for storage on a transport vehicle, or for convenient storage at factory sites, thereby encouraging use of the bag.

Another object is to provide such a bag which is readily usable as a sample collection container.

A further object is to provide such a bag which can be readily and relatively economically fabricated and which may be reused.

SUMMARY OF THE INVENTION

It has now been found that the foregoing and related objects may be readily attained in a spill containment transfer bag for use about the point of coupling of the port of a tank and a conduit connected thereto, comprising a flexible bag member defining an enclosure. The bag has a bottom wall, a sidewall extending upwardly from the periphery of the bottom wall and a top wall, and the sidewall has a pair of opposed apertures which are adapted to permit passage therethrough of a portion of the tank adjacent its port and of the conduit. About the apertures therein the sidewall has means to seat snugly about the tank portion and conduit so as to provide a seal thereabout. The top wall provides a disengageable closure for the bag to permit access to its interior.

In the preferred embodiment, the bottom wall is rectangular, and the sidewall has four generally rectangular panels with the opposed apertures being on opposed panels. Desirably, the bag includes venting means to permit air to flow therethrough, and this may include an aperture in the top wall or sidewall and a vent member of air permeable material extending over the aperture and fastened to the wall about the aperture.

Preferably, it also includes a flap fastened at one end to the wall adjacent the vent member and extending over the vent member, and the flap is releasably fastened to the wall at least at its other end so as to cover the vent member.

Usually, the top wall is hingedly connected along one side margin to the upper end portion of the sidewall, and there is included means to releasably secure the top wall to the sidewall in a position overlying the sidewall and closing the interior of the bag. This may comprise flaps hingedly attached to the other side margins of the top wall and overlying portions of the sidewall, and hook and loop material provided on the underside of the flaps and on portions of the sidewall to releasably secure the flaps to the sidewall and thereby the top wall in a position overlying the sidewall.

Desirably, the snug seating means of the sidewall comprises portions of a resiliently expansible material. In the preferred embodiment, the bag has flaps overlying the apertures in the sidewall, and means releasably securing the flaps in a position over the apertures which may comprise hook and loop material on the underside of the flaps and on the outer surface or the sidewall.

To facilitate carrying the bag, it additionally includes lifting means on the sidewall, and generally will comprise at least one strap attached to the sidewall.

In the method for containing a spill the port of the tank is inserted through one of the opposed apertures and a conduit is inserted through the other of the apertures and coupled to the tank port. Generally, the closure provided in the top wall will be opened prior to insertion of the conduit and closed after coupling the conduit to the port. In using the preferred bag with the bag flaps overlying the apertures in the sidewall, the flaps are opened to insert the tank port and conduit. After the transfer of material, the inserted tank port and inserted conduit are withdrawn through the apertures, and the flaps are secured in positions overlying and closing the apertures. The transfer bag may be lifted by the lifting means with the collected spill therein, and the bag and spill transported to a remote location.

In collecting a sample of stored material from a tank, the tank port is inserted through the one aperture and the closure provided in the top wall is closed. A sample of material stored in the tank is discharged into the bag while permitting air to escape from the interior of the bag through the venting means. The tank port is removed from the aperture in the bag which is then closed by its flap.

In a method for containing a spill from the juncture of a vacuum conduit member having a vacuum port, the container port is inserted through one of the apertures, and through the opposite aperture is inserted in a vacuum conduit member having a vacuum port adjacent its end. The two are coupled, and the vacuum port of the vacuum conduit member is aligned with the venting means of the bag to prevent partial collapse of the bag to obstruct the vacuum port.

DETAILED DESCRIPTION OF THE PREFERRED EMBODIMENT

Figure 3:
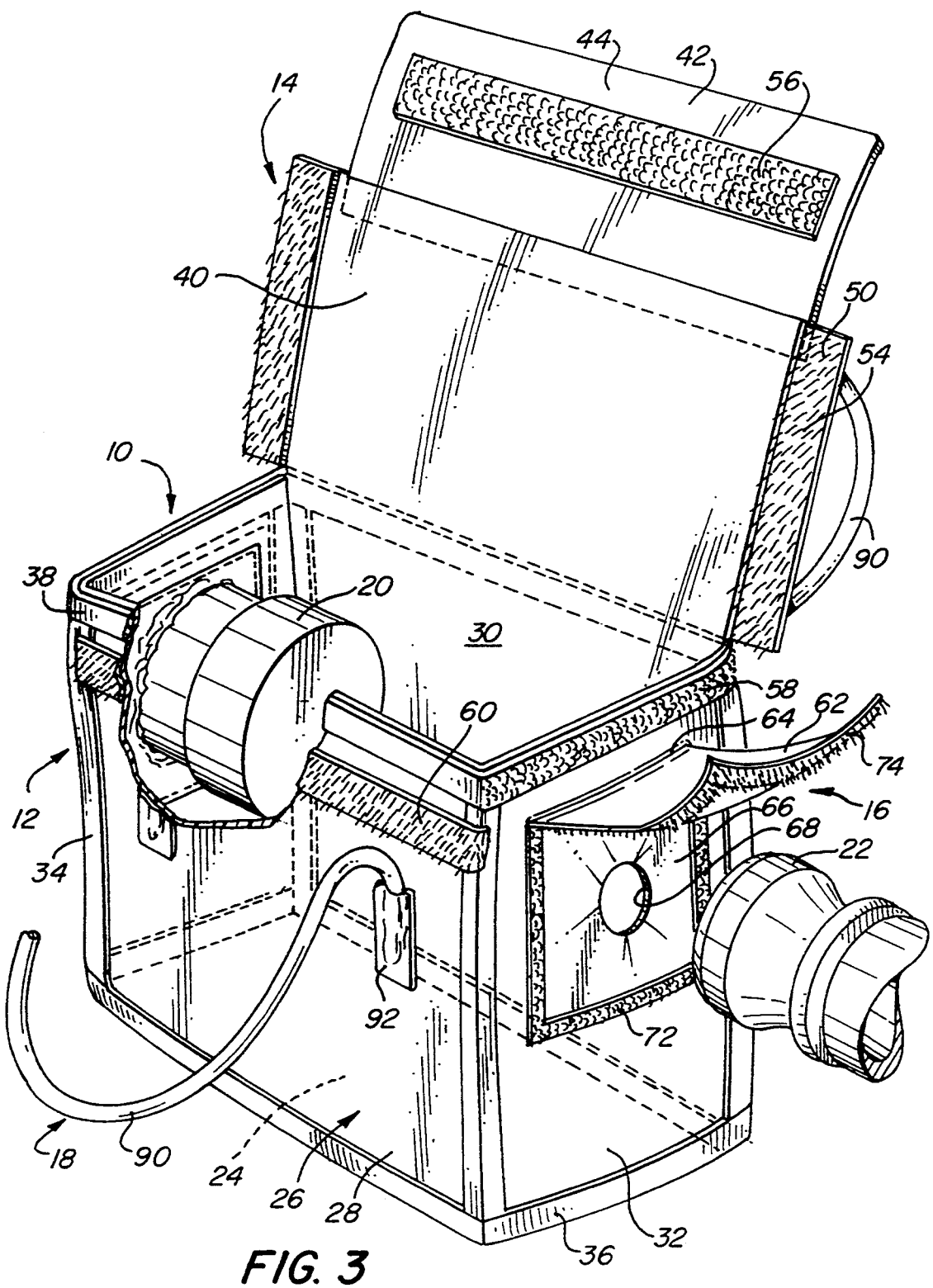
FIG. 3 is a perspective view of the spill containment transfer bag with its cover open, with one wall partly broken away to show the tank port, and with the conduit shown fragmentarily.

Turning first in detail to FIG. 3, therein illustrated is a spill containment transfer bag embodying the present invention and generally designated by the numeral 10. The spill containment transfer bag 10 has a rectangular cross section and includes a flexible body generally designated by the numeral 12, a cover generally designated by the numeral 14, a pair of opposed passage assemblies generally designated by the numeral 16 and lifting elements generally designated by the numeral 18. The containment transfer bag 10 is shown with a tank port 20 extending thereinto and with the end of a conduit or hose 22 positioned adjacent the containment transfer bag 10 for passage thereinto.

The body 12 includes a rectangular bottom wall 24 and a sidewall generally designated by the numeral 26 and having end panels 28, 30, and side panels 32, all of rectangular configuration.

An edge support strip 34 is provided to overlie and reinforce each of the four vertical edges formed by the junction of adjacent panels 28, 30 and 32. The edge support strip 34 may be fabricated from the same sheet material as that used for the panels 28, 30 and 32, or a different rugged fabric or synthetic resin sheeting if so desired. The edge support strips 34 are secured to the edge portions of the surrounding panels 28, 30 and 32.

A lower support strip 36 is provided to overlie each of the four horizontal edge portions formed by the junction of the bottom wall 24 and the panels 28, 30 and 32. The lower support strip 36 is secured to the edge portions of the surrounding panels 28, 30 and 32 and bottom wall 24. An upper support strip 38 is attached to the upper edge portions of the panels 28, 30 and 32. The upper support strip 38 and lower support strip 36 are conveniently comprised of the same material as the edge support strips 34, 36.

The cover 14 is comprised of a top wall 40 which is hingedly connected at one side margin to the upper edge of the wall panel 30. The top wall 40 may be fabricated integrally with the panel 30 or formed as a separate piece of sheet material, similar to that employed for the panels 28, 30 and 32, and secured to the panel 30.

Attached to the top wall 40 adjacent its front edge is the front flap 42, and a lower portion 44 of the inside surface 46 of the front flap 42 overlies a portion of the outer surface of the panel 28 adjacent its upper edge. Side flaps 50 are attached or bonded to each of the side edges of the top wall 40, or are formed as a part of the top wall 40.

The inside surfaces of each of the front flap 42 and side flaps 50 are provided with hook and loop material 54, 56 sold under the trademark VELCRO, and additional strips of hook and loop material 58 are attached to the portions of the upper support strip 38 that overlie the panels 32. A further strip 60 of hook and loop material is applied to the panel 28 below the upper support strip 38. The top wall 40, front flap 42 and side flaps 50 are conveniently comprised of the same material as the panels 28, 30 and 32. When the top wall 40 is in its closing position, the side flaps 50 overlie the end panels 32 and the front flap 42 overlies the front panel 28. In this position, the strips of hook and loop material 54 will engage the strips 58, and the strip 56 will engage the strip 60, thereby releasably securing the cover 14 in a closing position.

An access assembly 16 is provided in each of the end panels 32, and includes a rectangular access flap 62 secured at its upper end to an end panel 32, a cutout 63 in the end panel 32, and a panel 66 of resiliently deformable material extending over the cutout 63 and bonded to the end panel 32 thereabout. Centrally of the panel 66 is an aperture 68 which can be expanded in dimension by resiliently deformation of the material.

The aperture 68 is dimensioned to be smaller in cross section than those of the port 20 and conduit 22. The material may be stretched to increase the size of the opening and allow passage therethrough. Therefore, the material retracts to seal about the outer surface of the port 20 and conduit 22.

Strips 72 of hook and loop material are applied to the outer surface of the panel 66 adjacent its margins, and similar strips 74 are mounted on the inside surface of the flap 62, thus providing a closure for the aperture 68 when the flap 62 is secured in overlying position.

The lifting means 18 is comprised of a pair of straps 90 each of which is attached at its ends to one of the end panels 28, 30. A strap reinforcement strip 92 overlies the ends of each strap 90 at the point of connection to the end panels 28, 30.

Figure 2:
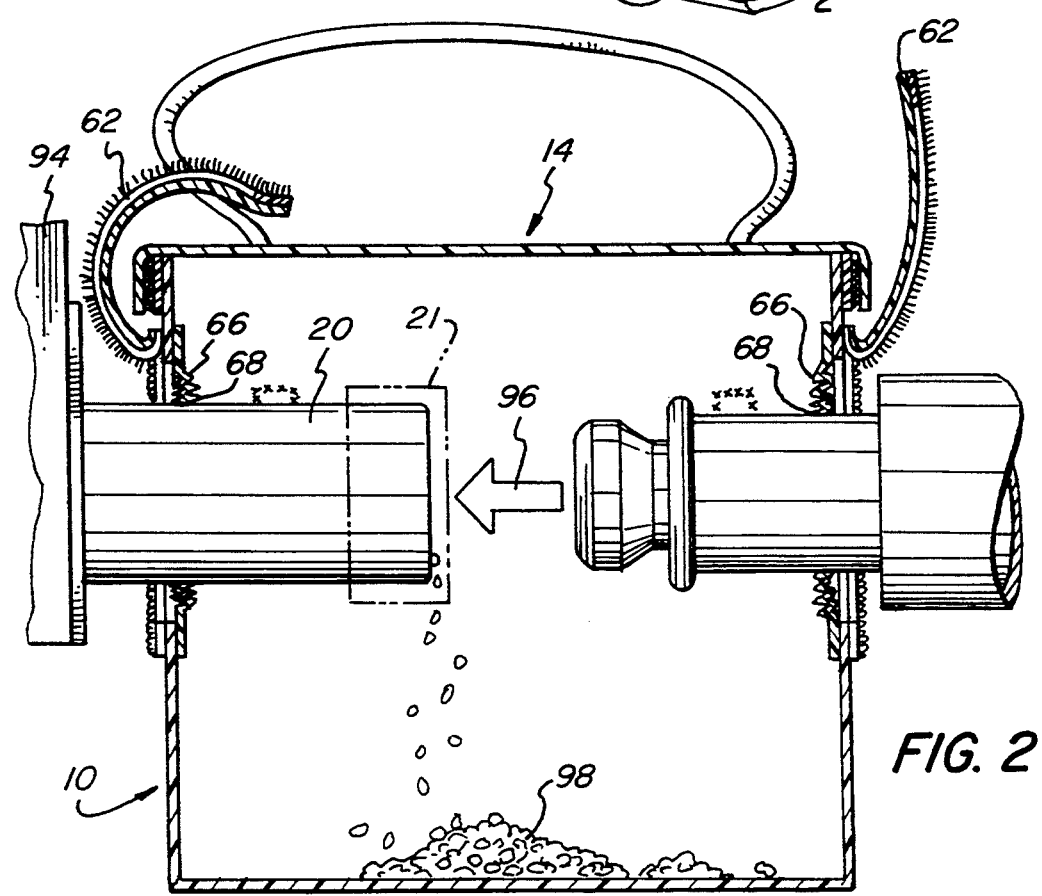
FIG. 2 is a fragmentary cross sectional view to an enlarged scale of the spill containment transfer bag of FIG. 1 taken along the line 2—2, and showing the tank port with the arrow indicating the direction of movement of the conduit onto the tank port.

Turning now to FIGS. 2 and 3, therein illustrated is the method in which the spill containment transfer bag 10 is used. In FIG. 2, the spill containment bag 10 is shown surrounding the tank port 20. The cover 14 and flap 62 have been previously opened to allow the user to reach into the bag and guide the end panel 32 over the port 20, to move the port 20 through the aperture 68 of the panel 66. Reaching into the spill containment transfer bag 10, the user then supports the other end wall panel 32, while the end of the conduit 22 is pushed through the aperture 68 of the panel 66 of the end wall panel 32. Once inserted, the end of the conduit 22 is then pushed further in the direction of the arrow 96 until it seats on the fitting of the exit port. As will be appreciated, the cap or closure 21 is removed immediately prior to coupling the conduit 22 to the port 20. Once the port 20 and the end of the conduit 22 are connected, the cover 14 is closed and secured in closed position.

Figure 1:
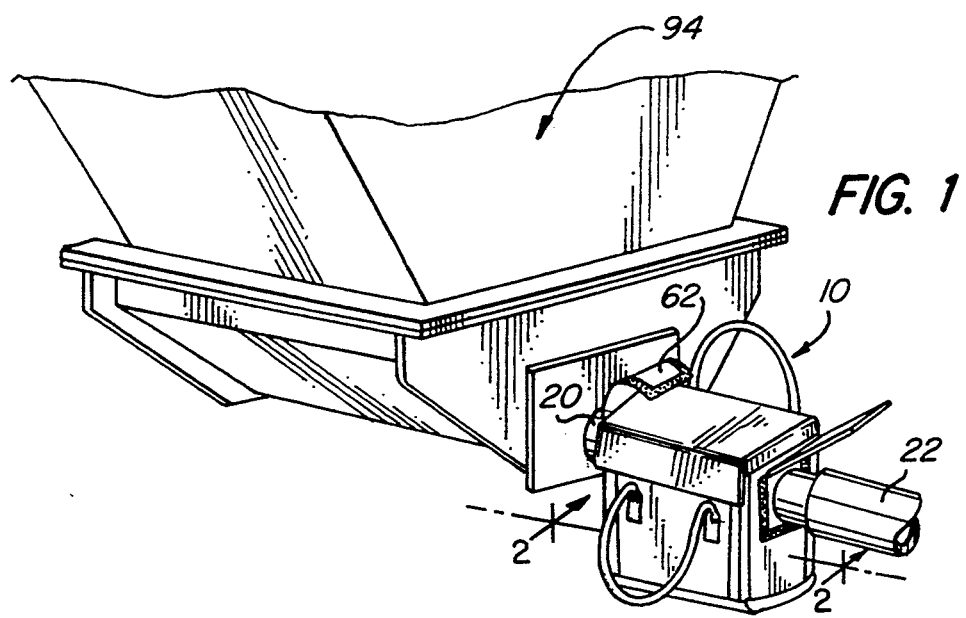
FIG. 1 is a perspective view of a spill containment transfer bag embodying the present invention and shown mounted about the port of a dry bulk tank and with a fragmentarily illustrated conduit extending thereinto.

FIG. 1 shows the spill containment transfer bag 10 properly mounted about the port 20 of a dry bulk tank shown in fragmentary view and generally designated by the numeral 94. The transfer of the dry bulk material is then effected with any spillage 98 being collected in the bottom of the spill containment transfer bag 10.

Figure 4:
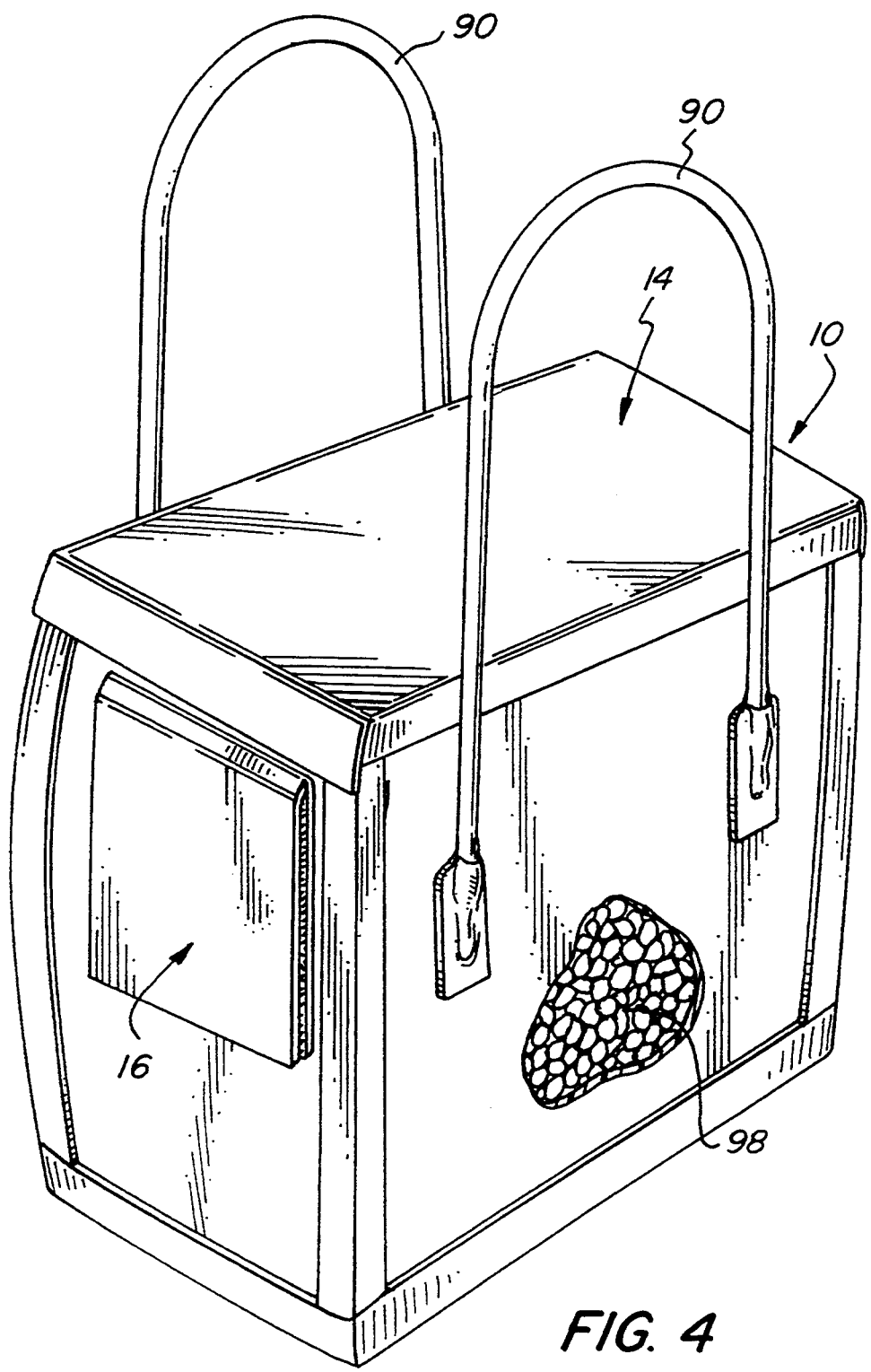
FIG. 4 is a perspective view of the spill containment transfer bag with the cover and both end flaps closed and with a portion of the sidewall broken away to show the dry bulk material contents.

Once the transfer of the dry bulk material is completed, the cover 14 is opened and the end of the conduit 22 is removed from the port 20, and the closure 21 is placed thereon. The conduit 22 is then moved in a direction opposite to that of arrow 96, and any additional spill 98 will continue to collect in the bottom of the spill containment transfer bag 10. Both the end of the conduit 22 and the port 20 are withdrawn from the apertures 68, with the access flaps 62 thereafter being secured in a position overlying the apertures 68. The cover 14 is also closed, thereby confining the dry bulk material spill 98 as shown in FIG. 4.

It should be noted that the spill containment transfer bag 10 may be utilized as a sample containment bag, allowing the user to obtain dry bulk material 98 for analysis and to safely transport the spilled material 98 to the analysis site.

Figure 5:
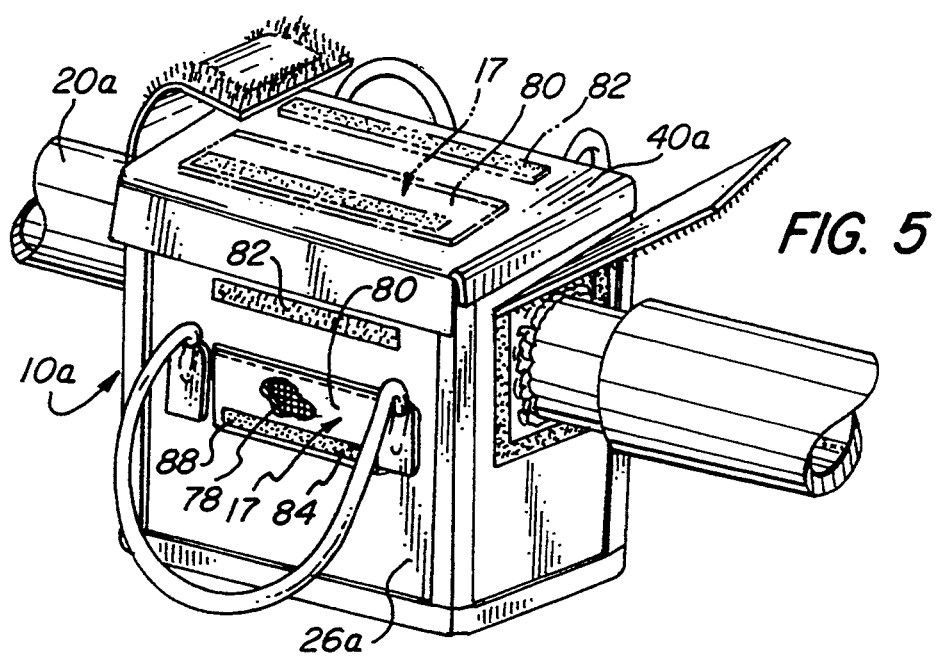
FIG. 5 is a perspective view similar to FIG. 1 of a preferred embodiment of a vented spill containment transfer bag embodying the present invention.
Figure 6:
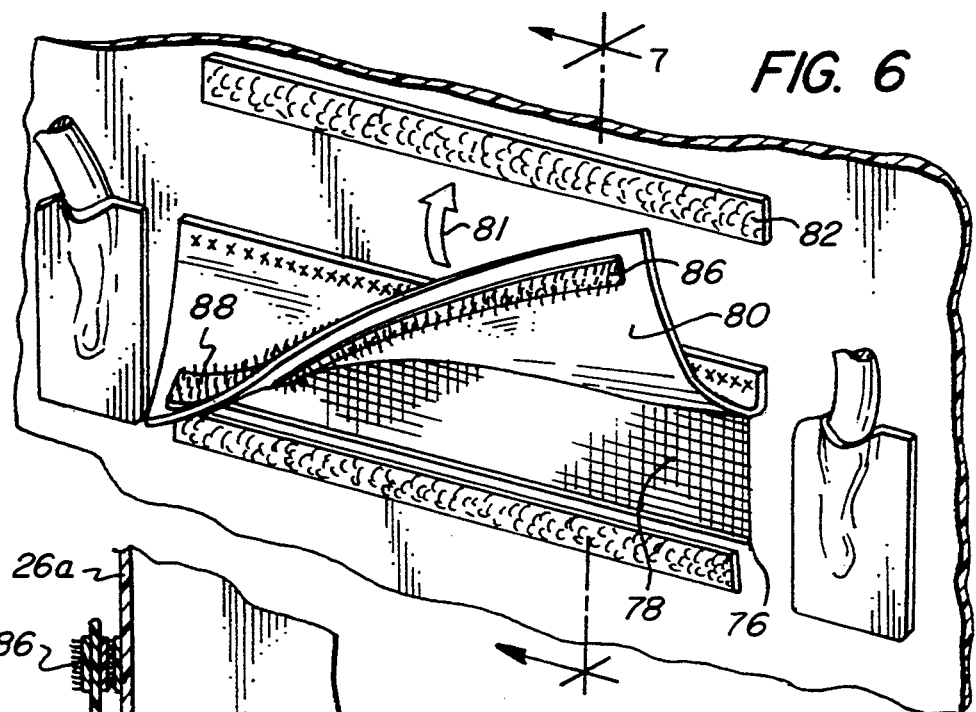
FIG. 6 is a fragmentary perspective view to enlarged scale, illustrating the vent structure on the front panel of the bag of FIG. 5.
Figure 7:
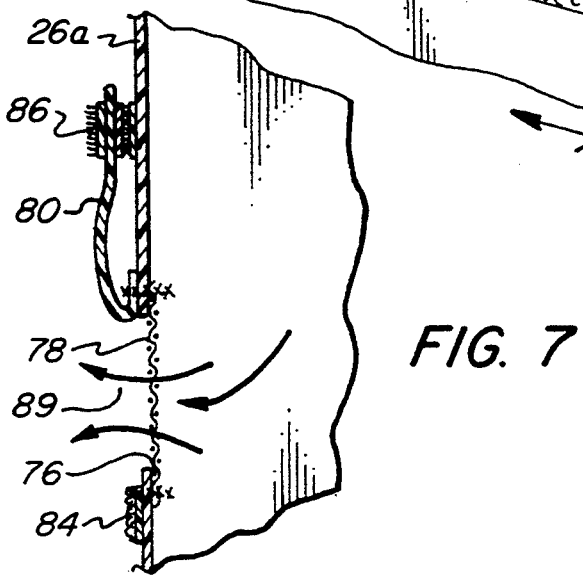
FIG. 7 is a fragmentary cross sectional view of the vent structure along the lines 7—7 of FIG. 6, and with the flap in its open position.

As seen in FIGS. 5–7, the preferred embodiment of the present invention includes a venting assembly 17 on one or both of the sidewall 26a and the top wall 40a. This assembly 17 comprises a rectangular aperture 76, and a rectangular member 78 of air permeable material such as open weave or highly porous material attached to the wall about the aperture 76 so as to extend over the aperture 16. The material selected should be impermeable to the sample to be collected. A closure flap 80, preferably fabricated of the same material as the walls 26a and 40a is fastened at one end along one margin of the aperture 76, and covers the aperture 76 when venting is not desired. Strips of hook and loop material 82 and 84 are fastened to the walls 26a, 40a spaced from the line of connection of the flap 80 to the wall 26a, 40a and along opposite margins of the apertures 76. Additional strips of hook and loop material 86 and 88 are placed on the inside and outside surfaces, of the flaps 80, parallel to and adjacent the free edge of the flaps 80.

When it is desirous to collect a sample of the containment transfer bag 10, the protective flap 80 is raised in the direction of arrow 81 to expose the member 78 of air permeable material 78, and it can be maintained in its open position by attaching the hook and loop material 88 on the outer surface of the flap 80 to the hook and loop material 82 on the wall 26a, 40a. When a sample is vented into the bag 10 from the port 20a, air is permitted to escape from bag 10a through the permeable member 78 as shown by the direction of arrows 89.

After completion of the venting, the flap 80 is moved to cover the air permeable member 78 and secured in this position by attaching the hook and loop material 86 on the inner surface of the flap 78 to the hook and loop material 84 on the wall 26a, 40a.

This preferred embodiment of transfer bag 10a may also be used for containing a resulting spill from the juncture of a vacuum conduit having a vacuum port (not shown) adjacent its end and the port of a tank. The use is similar to that described for the transfer bag 10 of the previous embodiment except that, prior to drawing a vacuum through the vacuum conduit, the vacuum port (not shown) on vacuum conduit (not shown) is aligned with the vent assembly 17 in the cover 40a and the flap 80 is removed from its position overlying the air permeable material 78. This allows for a relatively unobstructed flow of air through the air permeable member 78 and into the vacuum port (not shown), thereby preventing collapse of the bag 10a and resultant obstruction of the vacuum port (not shown).

In place of the front and side flaps 50 and hook and loop material 54 and 58, a zipper may be used to fasten the side edges of the top wall 40 to the upper edges of the end panels 32. Similarly, in place of front flap 42 and hook and loop material 56 and 60, a zipper may be used to fasten the front edge of the top wall 40 to the upper edge of the panel 28.

The bag member is fabricated from sheet material preferably with sewn seams. However, for liquids, double sealed or triple sealed seams is preferred with the sealing being effected by means of separate adhesives, or heat or solvent depending upon the material. The sheet material is foldable and durable and preferably fabricated from a polyvinyl chloride and polyethylene sheeting, but it also may be fabricated from sheeting of synthetic rubber (e.g. butadiene/acrylonitrile copolymer, polychloroprene, polyisoprene and polyurethane) providing the desired chemical inertness and capability to withstand acids, alkalis, solvents, petrochemicals and other chemical compounds with which it is intended to be used. The sheet material may be a laminate of cloth and resin sheeting, or resins sheeting reinforced with glass, resin, carbon, cotton, nylon and the like to increase strength. Conveniently, it may comprise a woven material core with resin coatings on both of its surfaces.

In the preferred embodiment, the bag member 12 is fabricated from two pieces. The first piece provides the bottom wall 24 and any two opposed panels 28, 30. The other piece provides another ply for the bottom wall 24 and the other two opposed panels 32. In this manner, the bag member 12 is provided with a two-ply bottom wall 24 for extra strength.

Alternatively, the bag member 12 may be constructed from a single continuous blank that provides the bottom wall 24 and the panels 28, 30, 32. As a further option, the bag member 12 may be constructed from three pieces, with the first piece providing the bottom wall 24 and any two opposing sidewall panels, and the other pieces providing the other two sidewall panels.

It should be apparent to those skilled in the art that the spill containment transfer bag 10 can be formed in a variety of sizes and shapes and in a variety of ways. Instead of the four panel sidewall 26 mentioned above, the sidewall 26 can similarly have three, five or more panels or even assume a conical or spherical shape.

Thus, it can be seen from the foregoing specification and attached drawings that the spill containment transfer bag of the present invention easily contains spill from the process of connecting and disconnecting a conduit from the port of a storage tank.

The bag is collapsible to allow for facile storage and transport in a vehicle, thereby encouraging its regular use for both spill containment and sample collection. It may be readily and relatively economically fabricated, and it may be reused.

Having thus described the invention, what is claimed is:

1. A spill containment transfer bag for use about the coupling of a port of a tank and a conduit connected thereto, comprising a flexible and foldable bag member defining an enclosure and having a bottom wall adapted to stably seat on a support surface, a sidewall extending upwardly from the periphery of said bottom wall, and a top wall, said sidewall having a pair of opposed apertures which are adapted to permit passage therethrough of a portion of the associated tank adjacent its port and of the associated conduit, said sidewall about said apertures having expansible means thereon adapted to vary the size of the aperture through the sidewall and seat snugly about the associated tank portion and conduit so as to provide a seal thereabout, and said top wall providing a disengageable closure for the bag to permit access to the interior.

2. The spill containment transfer bag in accordance with claim 1 wherein said bottom wall is rectangular, and said sidewall has four generally rectangular panels with said opposed apertures being on opposed panels.

3. The spill containment transfer bag in accordance with claim 1 wherein said top wall includes venting means to permit air to flow therethrough.

4. The spill containment transfer bag in accordance with claim 3 wherein said venting means includes an aperture in said top wall and a vent member of air permeable material extending over said aperture and fastened to said top wall about said aperture.

5. The spill containment transfer bag in accordance with claim 4 wherein said venting means also includes a flap fastened at one end thereof to said top wall adjacent said vent member and extending over said vent member, said flap being releasably fastened to said top wall at least at its other end so as to cover said vent member.

6. The spill containment transfer bag in accordance with claim 1 wherein said top wall is hingedly fastened along one side margin to the upper end portion of said sidewall.

7. The spill containment transfer bag in accordance with claim 6 further including means to releasably secure said top wall to said sidewall in a position overlying said sidewall and closing the interior of said bag.

8. The spill containment transfer bag in accordance with claim 7 wherein said means to releasably secure said top wall includes flaps hingedly attached to the other side margins of said top wall, said flaps overlying portions of said sidewall, and hook and loop material provided on the underside of said flaps and on said portions of said sidewall to releasably secure said flaps to said sidewall and thereby said top wall in a position overlying said sidewall.

9. The spill containment transfer bag in accordance with claim 1 wherein said snug seating means of said sidewall comprises portions of a resiliently expansible material.

10. The spill containment transfer bag in accordance with claim 1 wherein there are included flaps overlying said apertures in said sidewall and means releasably securing said flaps in a position over said apertures.

11. The spill containment transfer bag in accordance with claim 10 wherein said releasable securing means includes hook and loop material on the underside of said flaps and on the outer surface or said sidewall.

12. The spill containment transfer bag in accordance with claim 1 wherein said sidewall includes venting means to permit air to flow therethrough.

13. The spill containment transfer bag in accordance with claim 12 wherein said venting means includes an aperture in said sidewall and a vent member of air permeable material extending over said aperture and fastened to said sidewall about said aperture.

14. The spill containment transfer bag in accordance with claim 13 wherein said venting means also includes a flap fastened at one end thereof to said sidewall adjacent said vent member and extending over said vent member, said flap being releasably fastened to said sidewall at least at its other end so as to cover said vent member.

15. The spill containment transfer bag in accordance with claim 1 additionally including lifting means on said sidewall.

16. The spill containment transfer bag in accordance with claim 15 wherein said lifting means is comprised of at least one strap attached to said sidewall.

17. In a method for containing a spill from the juncture of a container port of a tank and a conduit extending therefrom, the steps comprising:
(a) providing a spill containment transfer bag of flexible and foldable material defining an enclosure and having a bottom wall adapted to stably seat on a support surface, a sidewall extending upwardly from the periphery of said bottom wall, and a top wall, said sidewall having a pair of opposed apertures to permit passage therethrough, said sidewall about said apertures having expansible means thereon adapted to vary the size of the aperture through the sidewall and seat snugly about elements extending therethrough so as to provide a seal thereabout, and said top wall providing a disengageable closure for the bag to permit access to the interior;
(b) inserting the port of a tank through one of said apertures with said means snugly seating about said port;
(c) inserting a conduit through the other of said apertures with said means snugly seating about said conduit; and
(d) coupling said inserted conduit to said tank port.

18. The method in accordance with claim 17 including the steps of opening said closure provided by said top wall prior to insertion of said conduit and closing said closure after coupling said conduit to said port.

19. The method in accordance with claim 17 wherein the providing step further includes providing on said bag flaps overlying said apertures in said sidewall and means releasably securing said flaps in a position over said apertures, and wherein said method further includes the steps of removing one of said flaps from a position over one of said apertures prior to inserting said tank port, removing the other of said flaps from a position over the other of said apertures prior to inserting said conduit, withdrawing the inserted tank port and inserted conduit from said apertures, and thereafter releasably securing said flaps in positions overlying said apertures.

20. The method in accordance with claim 17 wherein said providing step includes providing lifting means on said bag, and wherein said method further includes the steps of lifting said transfer bag by said lifting means with the collected spill therein, and transporting said bag and spill to a remote location.

* * * * *